United States Patent [19]

Insetta

[11] 4,047,240
[45] Sept. 6, 1977

[54] MULTIPLE ELECTRODE CAPACITOR ASSEMBLY

[76] Inventor: Victor Insetta, 540 Asharoken Ave., Northport, N.Y. 11768

[21] Appl. No.: 691,857

[22] Filed: June 1, 1976

[51] Int. Cl.² .............................................. H01G 4/12
[52] U.S. Cl. .................................... 361/275; 361/301; 361/321
[58] Field of Search ................................ 317/242, 261

[56] References Cited

U.S. PATENT DOCUMENTS

| 3,133,086 | 10/1938 | Dublier | 317/261 |
| 3,304,475 | 2/1967 | Gowen | 317/261 |
| 3,617,830 | 11/1971 | Perna | 317/261 |

FOREIGN PATENT DOCUMENTS

| 813,823 | 6/1937 | France | 317/242 |
| 910,460 | 5/1954 | Germany | 317/242 |
| 502,532 | 3/1939 | United Kingdom | 317/242 |

Primary Examiner—E. A. Goldberg
Attorney, Agent, or Firm—Edward H. Loveman

[57] ABSTRACT

A multiple electrode capacitor assembly for operation at very high frequencies has one or more pairs of coplanar conductive electrode plates embedded in a dielectric block with inner ends thereof spaced apart and outer ends connected respectively to terminals at opposite ends of the block to provide an assembly of reduced capacitance and increased Q as compared to conventional multiple layer capacitors.

6 Claims, 5 Drawing Figures

MULTIPLE ELECTRODE CAPACITOR ASSEMBLY

The invention relates to the art of multiple electrode capacitors and capacitor assemblies and more particularly concerns capacitors of the type employing laterally spaced very thin electrodes embedded in dielectric blocks and used at very high frequencies.

In capacitors of the type described, the Q factor may be expressed as:

$$Q = (X_C/R_S),$$

where
Q is a figure of merit:
$X_C$ is the capacitive reactance;
$R_S$ is the equivalent internal series resistance. The capacitive reactance may be expressed as:

$$X_C = (1/2\pi F C,) \text{ where}$$

F is the frequency of operation, and
C is the capacitance of the capacitor.

The equivalent series resistance $R_S$ is principally made up of dielectric losses and electrode resistance. It will be apparent from the above, that the Q of a capacitor assembly can be increased by increasing the capacitive reactance or reducing the series resistance or both. The capacitive reactance may be increased by reducing the capacitance, for a capacitor of given size, dielectric material and frequency of operation. In addition, the equivalent series resistance may be reduced by providing a plurality of conducting paths.

It is a principal object of the invention to provide a multiple electrode miniature capacitor which for a specified size has maximized Q, reduced capacitance per electrode with current carrying capacity larger than that of conventional multiple electrode capacitors.

The object of the invention is accomplished by providing a construction in which electrodes are arranged in coplanar disposition in a dielectric, monolithic block with a small break or space between adjacent inner ends of each pair of coplanar electrodes. Opposite ends of the electrodes are connected to conductive capacitor terminals to decrease the capacitance per electrode pair of the assembly and substantially increase the Q.

These and other objects and many of the attendant advantages of this invention will be readily appreciated as the same becomes better understood by reference to the following detailed description when considered in connection with the accompanying drawings in which.

Figure 1:
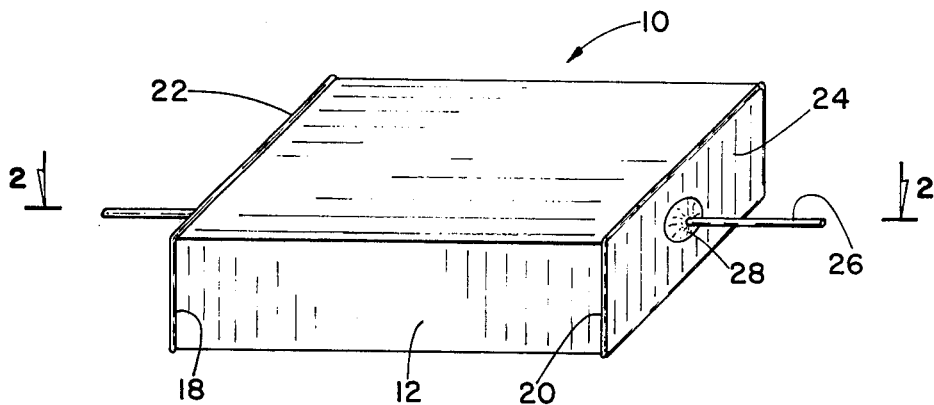
FIG. 1 is a perspective view of a capacitor assembly embodying the invention.
Figure 2:
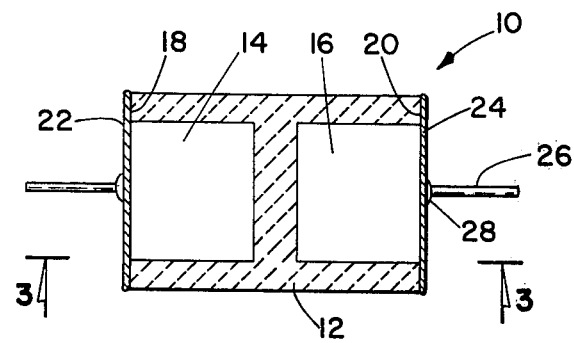
FIG. 2 is a top plan cross sectional view of the capacitor assembly of FIG. 1.
Figure 3:
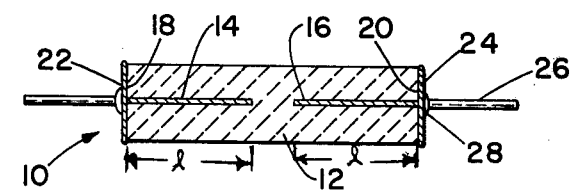
FIG. 3 is a vertical cross sectional view taken along line 3—3 of FIG. 2.

There is illustrated in FIGS. 1-3, a capacitor assembly generally designated as reference numeral 10 having a monolithic dielectric block 12 made of a low loss material such as titanium dioxide or any other low loss material. Embedded in the rectangular block 12 in coplanar disposition are two very thin rectangular, electrically conductive plates or electrodes 14, 16. The plates 14, 16 which may be made of a metal such as silver, gold, etc., extend outwardly to opposite end faces 18, 20 of the block 12 where they are in direct mechanical and electrical contact with electrically conductive metal films or end terminals 22, 24 secured to the block 12. A lead wire 26 is attached by a solder joint 28 to each of the films 22, 24 to enable connection of the capacitor assembly 10 to an external circuit (not shown). The coplanar disposition of the electrodes plates 14, and 16 minimizes the capacitance of the assembly. Plates 14 and 16 have a length 1 which are substantially equal, and have inner ends centrally spaced apart with respect to the overall length of the assembly.

Figure 5:
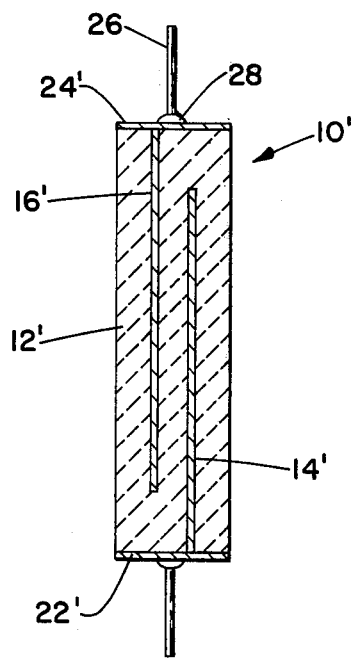
FIG. 5 is a vertical sectional view similar to FIG. 3 of a prior art capacitor assembly.

The construction of the capacitor assembly 10 should be contrasted with the construction of prior art capacitor or capacitor assembly generally designated as reference numeral 10' of FIG. 5, which is substantially of the same or external size as the capacitor 10. In FIG. 5 it will be noted that there are two parallel overlapping laterally spaced plates 14' and 16' embedded in block 12' and respectively connected to end films or end terminals 22', 24'. It will be noted that approximately the same amount of electrode material is used in both of the capacitor assemblies 10 and 10'. The blocks 12 and 12' are made of the same dielectric material. However, the capacitance of the assembly 10 is approximately 2 picofarads whereas that of the assembly 10' is 6 picofarads.

Since the capacitance of the assembly 10 is reduced and its internal resistance is also decreased as compared with that of the capacitor assembly 10, the capacitance reactance $X_C$ for the assembly 10, is increased and the corresponding Q is substantially increased i.e. by a factor as much as 10. By providing multiple coplanar pairs of electrodes the capacitance of the assembly 10' may be re-established and simultaneously the high Q may be maintained as illustrated in the embodiment of FIG. 4.

Figure 4:
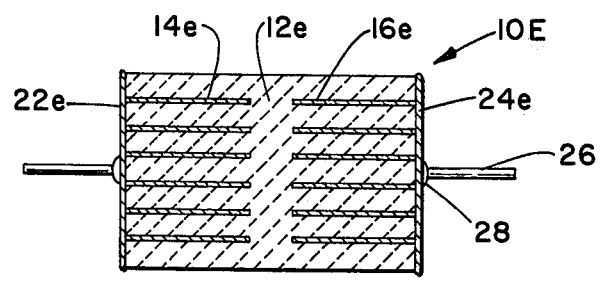
FIG. 4 is a vertical cross sectional view similar to FIG. 3 illustrating another embodiment of the invention.

A capacitor assembly 10E of FIG. 4 has a multiplicity of coplanar pairs of electrodes 14E, 16E embedded in dielectric block 12E which are respectively in direct electrical contact with end plates 22E, 24E. This construction provides a capacitor assembly having a multiplicity of capacitor elements in parallel, with increased Q as compared with conventional capacitors of the same size. This capacitor assembly also has increased current carrying capacity compared with conventional multiple electrode capacitors. It should be noted that it is preferably that the electrodes 14, 16, such as those illustrated in FIGS. 1, 2, 3, and 4, be of substantially equal size in order to achieve the increased Q.

The improved capacitor assemblies described hereinbefore are miniature units intended for operation at very high frequencies. The particular construction to be selected will depend on the desired capacitance, current handling capacity, and Q.

It should be understood that the foregoing relates to only a limited number of preferred embodiments of the invention, which have been by way of example only, and that it is intended to cover all changes and modifications of the examples of the invention herein chosen for the purpose of the disclosure, which do not constitute departures from the spirit and scope of the invention.

All the invention claimed is:

1. A multiple electrode capacitor assembly for use at very high frequencies comprising:
a monolothic ceramic block;
a pair of conductive electrode plates embedded in said block and disposed in coplanar array, adjacent respective inner ends of said electrodes being spaced apart inside said block; there being no floating electrode electrically coupled to said conductive electrodes; and conductive terminals in direct electrical contact with respective outer ends of said conductive electrodes, whereby said assembly has low capacitance and high Q, where Q is a figure of merit of said capacitor assembly.

2. A multiple electrode capacitor assembly as defined in claim 1, further comprising a plurality of other pairs of conductive electrode plates laterally spaced and embedded in said block, said electrodes in each one of said other pairs being disposed in coplanar array and having inner ends spaced apart inside said block, with outer ends respectively in direct electrical contact with said conductive terminals, to constitute a multiplicity of capacitor elements arranged in parallel, for increasing the Q of said assembly.

3. A multiple electrode capacitor assembly as defined in claim 1, wherein each electrode plate in said pair of electrodes is of substantially equal length.

4. A multiple electrode capacitor assembly as defined in claim 2, wherein each electrode plate of said other pairs of electrodes plates are substantially equal in lenth.

5. A multiple electrode capacitor assembly as defined in claim 1, wherein said pair of conductive electrode plates are centrally spaced apart inside said block with respect to the length of said block.

6. A multiple electrode capacitor assembly as defined in claim 4, wherein said other pairs of conductive electrode plates are centrally spaced apart inside said block with respect to the length of said block.

* * * * *